(12) United States Patent
Khoury

(10) Patent No.: US 12,095,557 B2
(45) Date of Patent: Sep. 17, 2024

(54) METHODS FOR PERFORMING MULTI-LINK HYBRID AUTOMATIC REPEAT REQUEST IN WIRELESS LOCAL AREA NETWORKS AND RELATED ELECTRONIC DEVICES

(71) Applicant: Ruckus IP Holdings LLC, Claremont, NC (US)

(72) Inventor: Peter Khoury, San Francisco, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 53 days.

(21) Appl. No.: 17/996,485

(22) PCT Filed: Mar. 10, 2021

(86) PCT No.: PCT/US2021/021703
§ 371 (c)(1),
(2) Date: Oct. 18, 2022

(87) PCT Pub. No.: WO2021/221796
PCT Pub. Date: Nov. 4, 2021

(65) Prior Publication Data
US 2023/0231652 A1 Jul. 20, 2023

Related U.S. Application Data

(60) Provisional application No. 63/017,586, filed on Apr. 29, 2020.

(51) Int. Cl.
*H03M 13/03* (2006.01)
*H04L 1/00* (2006.01)
(Continued)

(52) U.S. Cl.
CPC .............. *H04L 1/0068* (2013.01); *H04L 1/04* (2013.01); *H04L 1/1893* (2013.01)

(58) Field of Classification Search
CPC ........................... H04L 1/0068; H04L 1/0069
See application file for complete search history.

(56) References Cited

U.S. PATENT DOCUMENTS 10,461,779 B2 * 10/2019 Hong .................... H03M 13/13
10,666,392 B2 * 5/2020 Ge ...................... H03M 13/618
(Continued)

FOREIGN PATENT DOCUMENTS

WO 2018083647 A1 5/2018
WO 2020076380 A1 4/2020

OTHER PUBLICATIONS

"International Search Report and Written Opinion of the International Searching Authority", International Application No. PCT/US2021/021703, Jun. 28, 2021, 14 pp.
(Continued)

*Primary Examiner* — Esaw T Abraham
(74) *Attorney, Agent, or Firm* — Myers Bigel, P.A.

(57) ABSTRACT

Methods for an electronic device to communicate in a wireless local area network are provided in which information bits are encoded at the electronic device to provide a plurality of encoded bits. A first radio of the electronic device is used to transmit a first subset of the encoded bits over a first channel that is within a first frequency band, where the first subset of the encoded bits comprises less than all of the encoded bits. A second radio of the electronic device is used to transmit a second subset of the encoded bits over a second channel that is within a second frequency band.

13 Claims, 8 Drawing Sheets

(51) Int. Cl.
*H04L 1/04* (2006.01)
*H04L 1/1867* (2023.01)

(56) References Cited

U.S. PATENT DOCUMENTS

| | | |
|---|---|---|
| 11,394,398 B2 * | 7/2022 | Hui .................... H03M 13/6356 |
| 11,398,837 B2 * | 7/2022 | Xu ...................... H03M 13/155 |
| 11,411,678 B2 * | 8/2022 | Chen ..................... H04L 1/0041 |
| 11,898,440 B2 * | 2/2024 | Maclean ................ G10K 11/24 |
| 2009/0276675 A1 * | 11/2009 | Ojala .................... H04L 1/1819 |
| | | 714/790 |
| 2011/0093762 A1 | 4/2011 | Kwon et al. |
| 2013/0336335 A1 | 12/2013 | Hassan et al. |
| 2019/0319749 A1 | 10/2019 | Cao et al. |

OTHER PUBLICATIONS

"European Search Report in Corresponding Application No. 21796271.1, mailed Mar. 27, 24, 7 pages".
De La Oliva, Antonio , et al., "Improving WLAN reliability (joint TSN/11be session)", IEEE Draft, 2019, 1-10.
Fang, Yonggang , "Functional Requirements", IEEE Draft, 2019, 1-15.

* cited by examiner

METHODS FOR PERFORMING MULTI-LINK HYBRID AUTOMATIC REPEAT REQUEST IN WIRELESS LOCAL AREA NETWORKS AND RELATED ELECTRONIC DEVICES

CROSS-REFERENCE TO RELATED APPLICATIONS

The present application is a 35 U.S.C. § 371 national stage application of PCT Application No. PCT/US2021/021703, filed on Mar. 10, 2021, which itself claims priority to U.S. Provisional Patent Application Ser. No. 63/017,586, filed Apr. 29, 2020, the entire content of both of which are incorporated herein by reference as if set forth fully herein in their entireties.

BACKGROUND

The present invention generally relates to radio communications and, more particularly, to communications in wireless local area networks.

A wireless local area network ("WLAN") refers to a network that operates in a limited area (e.g., within a home, school, store, campus, shopping mall, etc.) that interconnects two or more electronic devices using wireless radio frequency ("RF") communications. Electronic devices belonging to users of a WLAN, such as smartphones, computers, tablets, printers, appliances, televisions, lab equipment and the like (herein "client devices"), can communicate with each other over the WLAN. Since wireless communications are used, the client devices can move throughout the area covered by the WLAN (e.g., as the users of the client devices move) and remain connected to the network. Most WLANs operate under a family of standards promulgated by the Institute of Electrical and Electronics Engineers ("IEEE") that are referred to as the IEEE 802.11 standards. WLANs operating under the IEEE 802.11 family of standards are commonly referred to as WiFi networks. Client devices that include a networking subsystem that includes a WiFi network interface can communicate over WiFi networks.

A Win network includes one or more access points (also referred to as ho spots) that are typically installed at fixed locations throughout the area covered by the WiFi network. The WiFi network can include a single access point that provides coverage in a very limited area or may include tens, hundreds or even thousands of access points that provide in-building and/or outdoor coverage to a large campus or region. Client devices communicate with each other and/or with wired devices that are connected to the WiFi network through the access points. The access points may be connected to each other and/or to one or more controllers through wired and/or wireless connections. The Win network typically includes one or more gateways that may be used to provide Internet access to the client devices. Currently, WiFi networks primarily use the 2.4 GHz and/or the 5 GHz frequency bands for the wireless communications.

All wireless communications are subject to transmission errors due to low signal-to-noise ratios and/or interference that may be present in the wireless channel. An electronic device receiving wireless communications may not only receive a desired RF signal, but may also receive various interfering signals and background noise, and it may be difficult for the receiver to distinguish between the desired signal and the interfering signals and/or background noise. Consequently, a stream of data bits transmitted by a first electronic device in a packet or a frame may not all be received correctly by a second electronic device. Forward error detection and error correction are widely used in wireless communications systems, including in WiFi networks, to help overcome low signal-to-noise ratios and/or to address interference problems. Forward error detection refers to a technique whereby extra bits may be added to a stream of data bits that are used to detect if errors are present in a received data bit stream. The simplest example of an error detection code is a so-called parity bit that may be added to a stream of data bits that specifies whether or not there is an odd or even number of data bits having the binary value of "1" in the stream of data bits. If interference or noise causes the receiver to misinterpret a data bit having the value of "0" as a "1", or a data bit having a value of "1" as a "0", then the number of bits having the value of "1" will not match the value of the parity bit. When this occurs, the receiver will know that there was at least one error in the received data stream. Of course, if there is more than one error, then the parity bit error detection code may or may not be able to identify that errors occurred. More sophisticated error detection codes can better identify whether errors are present in a received data stream, but also require adding more than a single extra bit to each transmitted data stream. Cyclic redundancy checks are a widely used class of error detection codes which append bits that represent the remainder of a polynomial division of the bits in the data stream.

Error correction codes refer to techniques that may be used to not only identify that errors are present in a received data stream, but to also automatically correct those errors. Error correction codes may encode a stream of data bits to generate a plurality of error correction bits that replace the stream of data bits. The error correction bits are decoded at the receiver and, depending upon the type of error correction code used, some minimum number of errors may be corrected in the received data stream. While error detection typically only adds a small number of error detection bits to each transmission (e.g., less than 10% of the number of data bits), the use of error correction often doubles or even triples the number of bits included in a transmission. Thus, while error correction codes may be a powerful tool for correcting errors in wireless communications, they add a significant amount of overhead to every wireless transmission. While the amount of extra or "overhead" bits added by error correction codes may be reduced by using less powerful encoding schemes and/or by puncturing the encoded data by removing bits therefrom, such techniques reduce the number of errors that can be corrected.

Automatic Repeat Request "ARQ" is another known technique that may be used to address the problem of interference and/or noise induced errors in wireless communications. With ARQ, an error detecting code (e.g., a cyclic redundancy check) is used to add error detection bits to a plurality of information bits. The information bits and error detection bits are then transmitted to another electronic device. If the receiver at the receiving electronic device detects that the receive stream of data bits has been corrupted through examination of the error detection bits, then the receiver will request that the sender resend the message. In WiFi networks, this may be accomplished by the receiving electronic device not sending an acknowledgement after decoding the message or by the receiving electronic device transmitting a "negative acknowledgement" back to the transmitting electronic device, where the negative acknowledgement actively notifies the transmitting electronic device that the transmission was not successfully received. One way in which such a negative acknowledgment is commonly implemented is by the receiving electronic device transmitting block acknowledgements back to the transmitting electronic device that list the successfully received packets in sequence. The absence of a packet number in the block acknowledgment acts as a negative acknowledgment that notifies the transmitting electronic device that the packet(s) whose numbers are missing in the block acknowledgment were not successfully received.

Hybrid ARQ (HARQ) is also known in the art, and is a combination of forward error correction coding and ARQ error control. With hybrid ARQ, both error detection and error correction techniques are used to encode the information bits. As discussed above, the use of the error correction code may result in a significant increase in the number of bits included in each transmission. In order to reduce the size of each transmission, the encoded bits may be "punctured," meaning that a certain number of the encoded bits are removed from the stream of encoded bits that are to be transmitted. For example, if the error correction encoder outputs a stream of 200 encoded bits that are to be transmitted, some number (e.g., 50) of the bits may be punctured (removed) so that only a total of 150 encoded bits are transmitted. If the error detection bits at the receiver of a receiving electronic device indicate that the receiving electronic device successfully decoded the received data stream to recover the original information bits, then no additional action is required, and the effective throughput may be increased since the information was transmitted using only 150 bits instead of 200 bits. If, however, the decoded error detection bits indicate that the decoding was not successful, then the receiving electronic device will request that the transmitting electronic device send the "punctured" bits that were not included in the original transmission. In WiFi networks, this may be accomplished by the receiving electronic device not sending an acknowledgement after decoding the message or by the receiving electronic device sending a negative acknowledgement such as a block acknowledgement with the packet numbers of the packets that were not successfully received omitted. The punctured bits are combined at the receiver with the originally received bits, and decoding is again performed. Since the decoder now has all of the encoded bits, it may correct more errors than was the case with the originally received punctured data stream, and hence the likelihood that the receiver can correctly decode the received signal may be increased significantly.

SUMMARY

Pursuant to embodiments of the present invention, methods for a first electronic device that includes a first radio and a second radio to communicate in a wireless local area network are provided. Pursuant to these methods, information bits are encoded at the first electronic device to provide a plurality of encoded bits. The encoded bits are punctured into at least a first subset of encoded bits and a second subset of encoded bits, where each of the first and second subsets includes at least one bit. The first radio is used to transmit the first subset of encoded bits in a first message over a first channel that is within a first frequency band. The second radio is used to transmit the second subset of encoded bits in a second message over a second channel that is within a second frequency band.

In some embodiments, the first electronic device may be an access point and the first message and the second message may both be addressed to a client device.

In some embodiments, the first electronic device may be a client device and the first message may be addressed to a first access point. The second message may be addressed to the first access point or to a second access point.

In some embodiments, the first channel and the second channel may be concurrently established between the first electronic device and a second electronic device.

In some embodiments, the first channel may be within one of a 2.4 GHz frequency band and a 5 GHz frequency band and the second channel may be within the other of the 2.4 GHz frequency band and the 5 GHz frequency band.

In some embodiments, the first and second subsets of encoded bits may together include all of the encoded bits.

In some embodiments, the first and second subsets of encoded bits may together include less than all of the encoded bits.

In some embodiments, the second message may be transmitted in response to not receiving an acknowledgment within a predetermined timeout period in response to the first message. In other embodiments, the second message may be transmitted in response to receiving a negative acknowledgment in response to the first message.

In some embodiments, the first and second messages may be transmitted concurrently.

Pursuant to further embodiments of the present invention, methods for a first electronic device that includes a first radio to communicate in a wireless local area network are provided. Pursuant to these methods, error detection encoding is performed on a plurality of information bits to generate a plurality of error detection bits. Error correction coding is then performed on the combination of the information bits and the error detection bits to generate a plurality of error correction encoded bits. The first radio is used to transmit a first subset of the error correction encoded bits in a first message over a first channel. A second radio is used to transmit a second subset of the error correction encoded bits in a second message over a second channel.

In some embodiments, the first electronic device may be an access point and the first and second messages may both be addressed to a client device. In other embodiments, the first electronic device may be a client device and the first message may be addressed to a first access point and/or the second message may be addressed to a second access point. Alternatively, the second message may be addressed to the first access point.

In some embodiments, the first channel may be within a first frequency band and the second channel may be within a second frequency band that is different than the first frequency band. For example, in some embodiments, the first channel may be within the 2.4 GHz frequency band and the second channel may be within the 5 GHz frequency band, while in other example embodiments, the first channel may be within the 5 GHz frequency band and the second channel may be within the 2.4 GHz frequency band.

In some embodiments, the second message may be transmitted in response to not receiving an acknowledgment within a predetermined timeout period in response to the first message. In other example embodiments, the second message may be transmitted in response to receiving a negative acknowledgment in response to the first message.

In some embodiments, the first channel and the second channel may be simultaneously open.

In some embodiments, the second radio may be part of the first electronic device.

In some embodiments, the first electronic device may be a first access point, and the second radio may be part of a second access point, and the first subset of the error correction encoded bits may be transmitted with an address for a client device. In such embodiments, the method may further comprise transmitting the second subset of the error correction encoded bits from the first access point to the second access point and providing the address for the client device to the second access point.

Pursuant to still further embodiments of the present invention, methods of communicating in a wireless local area network are provide din which a first signal is received at a first radio. The first signal is demodulated to obtain a first received bit stream. The first received bit stream is then decoded, and a determination is made as to whether the first received bit stream was correctly decoded. A second signal is received at a second radio. The second signal is demodulated to obtain a second received bit stream. At least a portion of the first received bit stream and the second received bit stream are then combined to generate a combined received bit stream, The combined received bit stream is then decoded.

In some embodiments, the first and second signals may be received at a first access point of the wireless local area network.

In some embodiments, the first signal may be received at a first access point of the wireless local area network and the second signal may be received at a second access point of the wireless local area network.

In some embodiments, these methods may further include receiving a third signal at the first access point that includes the second received bit stream.

In some embodiments, the first signal may be within the 2.4 GHz frequency band and the second signal may be within the 5 GHz frequency band. In other example embodiments, the first signal may be within the 5 GHz frequency band and the second signal may be within the 2.4 GHz frequency band.

In some embodiments, a negative acknowledgement may be transmitted in response to determining that the first received bit stream was not properly decoded.

Pursuant to still further embodiments of the present invention, electronic devices are provided that include an antenna and an interface circuit, coupled to the antenna. The interface circuit includes a first radio and a second radio, and is configured to receive a first signal at the first radio, demodulate the first signal to obtain a first received bit stream, decode the first received bit stream, determine if the first received bit stream was correctly decoded, receive a second signal at the second radio, demodulate the second signal to obtain a second received bit stream, combine at least a portion of the first received bit stream and the second received bit stream to generate a combined received bit stream, and decode the combined received bit stream.

In some embodiments, the electronic device may be an access point or a client device.

In some embodiments, the first radio may be configured to operate within one of the 2.4 GHz and 5 GHz frequency bands, and the second radio may be configured to operate within the other of the 2.4 GHz and 5 GHz frequency bands.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

Figure 1:
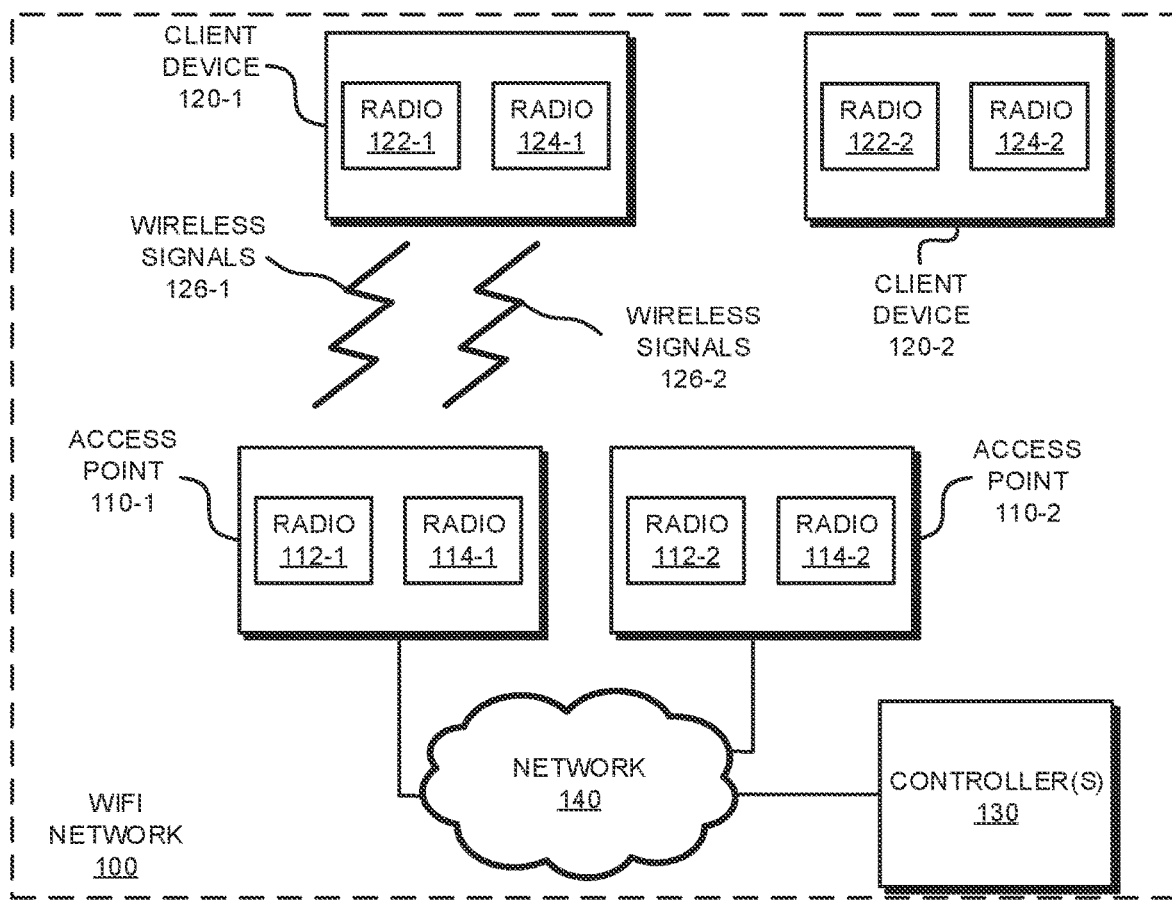
FIG. 1 is a block diagram illustrating an example of a system according to embodiments of the present invention.

Proposals have been made in the IEEE 802.11be standards working group for wireless local area networks ("WLAN") that support so-called "multi-link" operation. Currently most WLANs include access points that communicate in two frequency bands, namely the 2.4 GHz frequency band and the 5 GHz frequency band. User electronic devices (e.g., cellphones, laptops, printers, appliances, etc.) of the WLAN, which again are referred to herein as "client devices," may connect to the WLAN over either a 2.4 GHz channel or a 5 GHz channel. If multi-link capabilities are implemented, a client device will be allowed to communicate concurrently with an access point over more than one connection. For example, a client device will be allowed to communicate concurrently with an access point over both a 2.4 GHz channel and a 5 GHz channel. Such multi-link operation may allow higher throughput rates between a client device and the WLAN. It may also be possible for a client device to communicate with a first access point over a 2.4 GHz channel while concurrently communicating with a second access point over a 5 GHz channel. Note that concurrently means that communications sessions are established at the same time over both channels, and does not require that communications occur simultaneously over both channels.

Pursuant to embodiments of the present invention, techniques are provided for performing hybrid ARQ using multiple different communication channels. As is known in the art, communication performance in a WLAN may degrade for a number of reasons. One of the major reasons is interference generated by other electronic devices, such as other users of the WLAN (or a nearby WLAN) that are transmitting at the same frequency or other electronic devices (e.g., appliances, cell phone equipment, etc.) that generate RF energy in the same frequency band being used for communications in the WLAN. A second major cause of degraded communications performance is multipath fading, which refers to signal attenuation and/or distortion that can occur when subcomponents of a transmitted RF signal arrive at a receiver over different physical paths (due to reflections), which can result in partial cancellation of the received signal due to differences in path length (and hence differences in phase) between the subcomponents of the received signal. Typically, both the interference (and noise) levels and multipath fading effects in the 2.4 GHz frequency band are relatively independent with respect to the interference (and noise) levels and multipath fading in the 5 GHz frequency band. Embodiments of the present invention leverage off of the fact that the communications performance in both frequency bands will usually not be degraded simultaneously, and hence improved methods for performing hybrid ARQ may be provided by transmitting different portions of encoded communications over two different radios that operate in different frequency bands.

For example, in one embodiment, hybrid ARQ may be used to send a transmission from a client device to an access point in a first frequency band. The information bits may be encoded using both error detection and error correction encoding (which may be applied serially or which may be applied together using a code that performs both error detection and error correction). Then, only a portion of the encoded bits may be transmitted from the client device to the access point over a channel in a first frequency band (e.g., the 5 GHz frequency band). The encoded bit stream is received and demodulated at the access point, and the decoder at the access point then determines whether or not the message was correctly decoded (e.g., based on a comparison of the error detection code bits to the received information bits). If the received bit stream was properly decoded, then an acknowledgement is sent by the access point indicating that the transmission was successfully received. If, however, the decoder at the access point determines that the message was not correctly decoded (e.g., because the error detection bits indicate that errors are present), than no acknowledgement or a negative acknowledgement (e.g., a block acknowledgment in which the packet sequence number corresponding to the packet that was not successfully received is omitted) is sent by the access point, and the received bit stream (which may include, for example, a determined value for each received bit or symbol and information regarding the level of certainty regarding the determined values, raw constellation values or the like, as will be discussed in more detail herein) may be saved in memory. After a timeout period expires, the client device may then send the remaining portion of the encoded bits to the access point over a concurrent channel established in a second frequency band (e.g., the 5 GHz frequency band). The access point may then combine the second received bit stream (that was received over the channel in the second frequency band) with the previously received bit stream (that was stored in memory) and then decode this combined received bit stream. Since the interference, noise and/or fading that may have caused the initial failed transmission in the first frequency band are unlikely to be present to the same degree in the second frequency band, it is more likely that the additional encoded bits that are transmitted in the second frequency band are received with a higher signal-to-interference plus noise ratio, which makes it more likely that the access point will be able to successfully decode the combined message that includes both received bit streams. The above-described communications may also be performed in reverse (i.e., from the access point to the client device) in the exact same manner.

In some embodiments, methods for an electronic device to communicate in a wireless local area network are provided. Pursuant to these methods, information bits are encoded at the electronic device to provide a plurality of encoded bits. The encoded bits are punctured into at least a first subset of encoded bits and a second subset of encoded bits, where each of the first and second subsets includes at least one bit. A first radio of the electronic device is used to transmit the first subset of encoded bits in a first message over a first channel that is within a first frequency band. A second radio of the electronic device is used to transmit the second subset of encoded bits in a second message over a second channel that is within a second frequency band. The first and second subsets of encoded bits may, but need not, include all of the encoded bits. The second message may be transmitted in response to an indication that the first message was not properly received. The electronic device may comprise, for example, an access point or a client device.

In other embodiments, methods for an electronic device to communicate in a wireless local area network are provided in which error detection coding is performed on a plurality of information bits to generate a plurality of error detection bits. Error correction coding is then performed on the combination of the information bits and the error detection bits to generate a plurality of error correction encoded bits. A first radio of the electronic device is then used to transmit a first subset of the error correction encoded bits in a first message over a first channel. A second radio is used to transmit a second subset of the error correction encoded bits in a second message over a second channel. The message may be transmitted in response to not receiving an acknowledgment within a predetermined timeout period in response to the transmission of the first message or to receiving a negative acknowledgement that indicates that the first message was not successfully received. The second radio may be part of the electronic device or may be part of a second electronic device (e.g., the electronic device and the second electronic device may comprise a pair of access points that are in communication with one another).

In still further embodiments, methods of communicating in a wireless local area network are provided in which a first signal that includes a first data stream is received at a first radio. The first signal is demodulated to generate a first received bit stream. The first received bit stream is then decoded, and a determination is made as to whether or not the first received bit stream was correctly decoded. A second signal that includes a second data stream is received at a second radio, and the second signal is demodulated to generate a second received bit stream. At least a portion of the first received bit stream and the second received bit stream are then combined to provide a combined received bit stream, and the combined received bit stream is then decoded.

Electronic devices capable of performing each of the above-described methods are also provided.

Embodiments of the present invention will now be described in further detail with reference to the figures.

FIG. 1 is a block diagram illustrating a very simple, example WiFi network 100 in which the communication techniques according to embodiments of the present invention may be practiced. As shown in FIG. 1, the WiFi network 100 may include one or more access points 110, one or more client devices 120 (such as cellular telephones, computers, tablets, printers and a wide range of other WiFi-capable electronic devices), and one or more optional controllers 130. The access points 110 may communicate with one or more of the client devices 120 using wireless communication that is compatible with an IEEE 802.11 standard. Thus, the wireless communication may occur in, for example, the 2.4 GHz frequency band, the 5 GHz frequency band and/or the 60 GHz frequency band. However, other frequency bands may be used, and it will be appreciated that future versions of the IEEE 802.11 standards may operate in additional or different frequency bands, such as, for example, the 6 GHz frequency band.

The access points 110 may also communicate with the one or more optional controllers 130 via a network 140, which may comprise, for example, the Internet, an intra-net and/or one or more dedicated communication links. It will also be appreciated that some access points 110 may only be connected to the network 140 through other access points 110 (e.g., in a mesh network implementation). Note that the optional controllers 130 may be at the same location as the other components in WiFi network 100 or may be located remotely (e.g., cloud based controllers 130). The access points 110 may be managed and/or configured by the one or more optional controllers 130. The access points 110 may communicate with the controller(s) 130 or other services using wireless communications and/or using a wired communication protocol, such as a wired communication protocol that is compatible with an IEEE 802.3 standard (which is sometimes referred to as 'Ethernet'), e.g., an Ethernet II standard. The access points 110 may provide the client devices 120 access to network 140. The access points 110 may be physical access points or may be virtual or 'software' access points that are implemented on a computer or other electronic device. While not shown in FIG. 1, the WiFi network 100 may include additional components or electronic devices, such as, for example, a router.

The access points 110 and the client devices 120 may communicate with each other via wireless communication. The access points 110 and the client devices 120 may wirelessly communicate by: transmitting advertising frames on wireless channels, detecting one another by scanning wireless channels, exchanging subsequent data/management frames (such as association requests and responses) to establish a connection and configure security options (e.g., Internet Protocol Security), transmit and receive frames or packets via the connection, etc.

As described further below with reference to FIG. 10, the access points 110, client devices 120 and/or the controllers 130 may include subsystems, such as a networking subsystem, a memory subsystem and a processor subsystem. The networking subsystems may include radios that are used to wirelessly communicate with each other. For example, the access points may include a first radio 112 that is configured to transmit and receive signals in a first frequency band (e.g., the 2.4 GHz frequency band), and a second radio 114 that is configured to transmit and receive signals in a second frequency band (e.g., the 5 GHz frequency band). Similarly, the client devices likewise may include a first radio 122 that is configured to transmit and receive signals in the first frequency band (e.g., the 2.4 GHz frequency band), and a second radio 124 that is configured to transmit and receive signals in the second frequency band (e.g., the 5 GHz frequency band). For ease of discussion herein, the first frequency band will be assumed to be the 5 GHz frequency band and the second frequency band will be assumed to be the 2.4 GHz frequency band, although the present disclosure is not limited thereto.

As can be seen in FIG. 1, wireless signals 126-1 (represented by a jagged line) are transmitted from the 2.4 GHz radio 122-1 in client device 120-1. These wireless signals are received by the 2.4 GHz radio 112-1 in at least one of the access points 110, such as access point 110-1. Likewise, wireless signals 126-2 (represented by a jagged line) are transmitted from the 5 GHz radio 124-1 in client device 120-1, and may be received by the 5 GHz radio 114-1 of access point 110-1. The wireless signals 126-1, 126-2 may comprise frames or packets that are received by access point 110-1. When multi-link communication is used, both radio 122-1 and radio 124-1 of client device 120-1 may establish concurrent connections and transmit and receive information with radios 112-1 and 114-1, respectively, of access point 110-1.

The communication between client device 120-1 and access point 110-1 may be characterized by a variety of performance metrics, including, for example, a data rate, throughput (i.e., the data rate for successful transmissions), an error rate (such as a retry or resend rate), a signal-to-noise ratio, a ratio of number of bytes successfully communicated during a time interval to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the description that follows, operations will be described in which a frame or a packet is processed by an access point 110 or a client device 120. The processing operations may include: receiving wireless signals with the frame or packet; decoding/extracting the frame or packet from the received wireless signals to acquire the frame or packet; and processing the frame or packet to determine information contained in the frame or packet. Only the ones of these operations that are particularly relevant to the communication techniques according to embodiments of the present invention will be described below, but it will be appreciated that the other operations may still be performed.

As new WiFi standards are introduced, they typically offer additional capabilities to compatible electronic devices relative to previous IEEE 802.11 standards. One such new standard, the IEEE 802.11be standard, is currently under development. As discussed above, the IEEE 802.11be standards working group is considering including multi-link operation in the standard. With multi-link operation, a client device 120 can concurrently be attached to an access point on both a channel operating at 2.4 GHz and a channel operating at 5 GHz. It is also being contemplated that a client device 120 could be attached to a first access point 110-1 over a channel operating at 2.4 GHz and to a second access point 110-2 over a channel operating at 5 GHz. By allowing a client device 120 to concurrently communicate with an access point 110 (or a pair of access points 110) over two different channels, the throughput between the client device 120 and the WiFi network may be increased.

One potential advantage of simultaneously communicating over two different channels that are at two different, and widely spaced apart, frequencies is that the degree of multipath fading will typically be independent for the two channels. The same is true for interference and, perhaps to a lesser extent, to the background noise levels. Thus, if one of the channels is experiencing multipath fading, interference and/or noise issues, it is likely that the other channel will not be. As a result, both higher throughput and/or improved reliability may be achieved.

Figure 2:
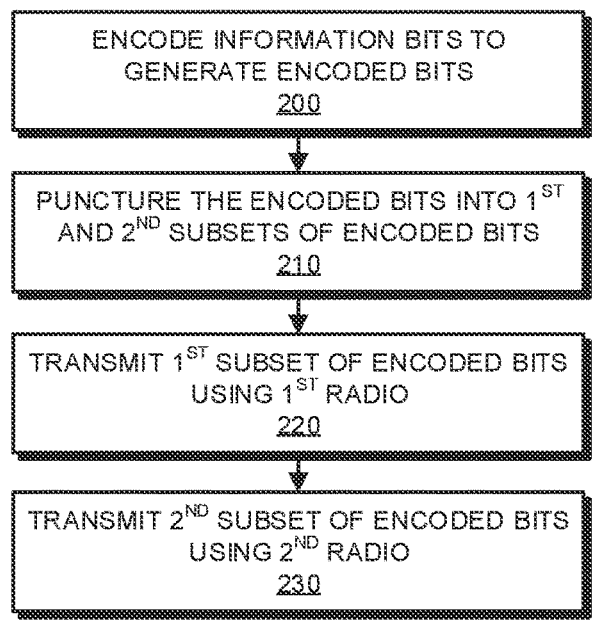
FIG. 2 is a flow chart illustrating a method for an electronic device to communicate in a wireless local area network according to embodiments of the present invention.

FIG. 2 is a flow chart illustrating a method for an electronic device to communicate in a wireless local area network according to embodiments of the present invention. The method of FIG. 2 may be performed, for example, by one of the access points 110 and/or by one of the client devices 120 of FIG. 1.

As shown in FIG. 2, an electronic device such as one of the access points 110 or client devices 120 of FIG. 1 may encode a plurality of information bits to generate a plurality of encoded bits (block 200). The encoding may include both error detection coding and error correction encoding, which may be applied sequentially or simultaneously. The encoded bits are punctured into at least a first subset of encoded bits and a second subset of encoded bits, where each of the first and second subsets includes at least one bit (block 210). The first subset of encoded bits may then be transmitted by the electronic device using a first radio in a first message (block 220). For example, the first subset of encoded bits may include less than 50%, less than 60%, less than 70%, less than 80% or less than 90% of the redundant bits (although the first subset will include at least as many encoded bits as there were information bits). The first radio may comprise one of a radio that operates in the 2.4 GHz frequency band or a radio that operates in the 5 GHz frequency band in example embodiments. The second subset of encoded bits may be transmitted by the electronic device using a second radio in a second message (block 230). The second subset of encoded bits may include all of remaining encoded bits that were not included in the first subset, or less than all of the remaining encoded bits. The second radio may comprise, for example, the other of the radio that operates in the 2.4 GHz frequency band or the radio that operates in the 5 GHz frequency band. The second message including the second subset of encoded bits may only be transmitted by the electronic device if the electronic device does not receive an indication that the first message including the first subset of encoded bits was properly received by a recipient electronic device.

Figure 3:
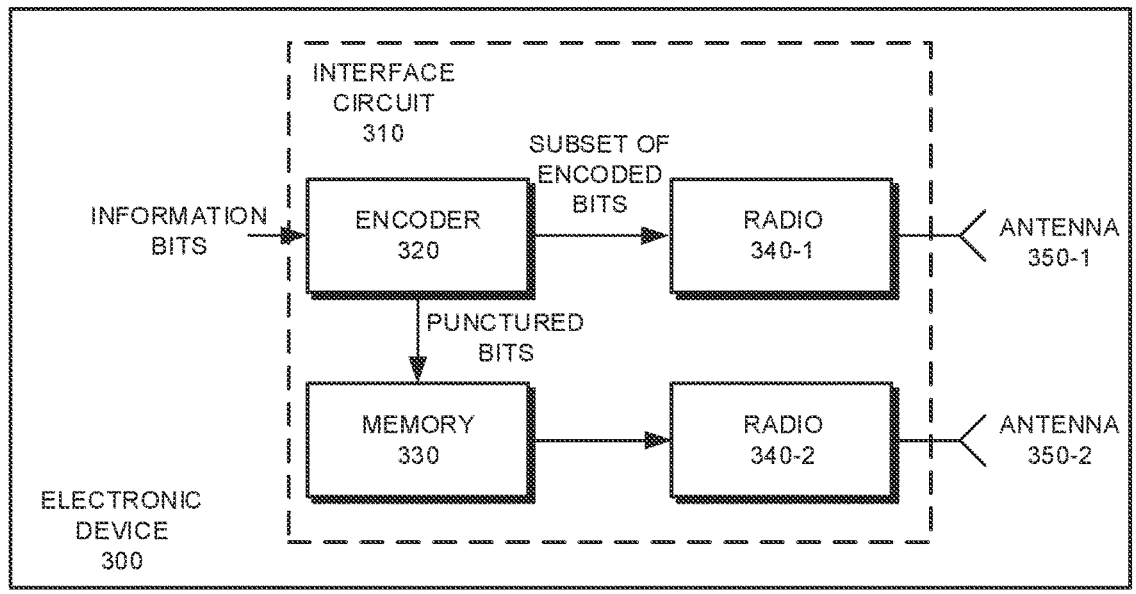
FIG. 3 is a block diagram illustrating components that may be used by an electronic device to transmit information using multi-link hybrid ARQ according to embodiments of the present invention.

FIG. 3 is a block diagram illustrating components that may be used by an electronic device 300 to transmit information using the multi-link hybrid ARQ communication techniques according to embodiments of the present invention. The electronic device 300 may comprise, for example, one of the access points 110 or one of the client devices 120 of FIG. 1. The electronic device 300 may perform any of the methods disclosed herein, specifically including the methods of FIGS. 2, 6 and 7.

As shown in FIG. 3, the electronic device 300 may include an interface circuit 310. It will be appreciated that all of the elements of the interface circuit 310 are not depicted in FIG. 3, and instead only certain elements are shown that are used to transmit information using the multi-link hybrid ARQ communication techniques according to embodiments of the present invention.

The interface circuit 310 includes, among other things, an error detection/correction encoder 320. The error detection/correction encoder 320 may comprise a single module that performs both error detection and error correction encoding, or may comprise multiple modules (e.g., a first module that performs error detection encoding and a second module that performs error correction encoding). The error detection/correction encoder 320 may be implemented, for example, in hardware, software and/or firmware.

The interface circuit 310 may further include, or be in communication with, a memory subsystem 330. The memory subsystem 330 may be used to store at least some of the encoded bits generated by the encoder 320. The interface circuit 310 further includes a first radio 340-1 and a second radio 340-2. The first radio 340-1 may, for example, be configured to transmit and receive RF signals in one of the 2.4 GHz or 5 GHz frequency band. The second radio 340-2 may, for example, be configured to transmit and receive RF signals in the other of the 2.4 GHz or 5 GHz frequency band.

During operation, the error detection/correction encoder 320 may receive a stream of information bits and use these information bits to generate a stream of encoded bits. The error detection/correction encoder 320 may also be configured to puncture the generated stream of encoded bits. As discussed above, puncturing a stream of encoded bits refers to removing or omitting selected ones of the encoded bits so that only a portion of the encoded bits are transmitted. Puncturing has the same general effect as encoding the bit stream with an error correction code having a higher rate. The coding rate refers to how many encoded bits are generated based on a data stream that has a certain number of bits. For example, if a code is used that generates 200 encoded bits from 100 information bits, the code rate is ½. If puncturing is used to remove 50 of the encoded bits, then with puncturing the effective code rate is ⅔. Different puncture rates may be used, for example, based on estimates of the channel conditions. One or more predefined puncturing patterns may be used. An inverse operation, known as depuncturing, is implemented at the decoder at the receiver. Moreover, while the puncturing is described above as being implemented within the error detection/correction encoder 320, it will be appreciated that this need not be the case, and that the puncturing could be performed by a separate module.

Still referring to FIG. 3, the punctured bits (i.e., the encoded bits that are removed from the stream of encoded bits that are to be transmitted) are stored in the memory subsystem 330. Any appropriate memory may be used including the memory subsystem for the electronic device 300, a dedicated memory subsystem that is part of the interface circuit 310, a block of registers, etc. The remaining encoded bits may then be passed to the first radio 340-1 and transmitted by the first radio 340-1 in a first message using a first antenna system 350-1. The encoded bits may be embedded into a packet or frame, and the packet/frame may be addressed to a second electronic device. The first message may comprise a single packet or frame or multiple packets or frames. If the electronic device 300 is an access point, the second electronic device may be a client device. If the electronic device 300 is a client device, the second electronic device may be an access point.

If an acknowledgement is received from the second electronic device indicating that the packet/frame (or multiple packets/frames) that includes the encoded bits was successfully received and decoded, the punctured bits that are stored in memory subsystem 330 may be discarded. However, if no acknowledgement is received from the second electronic device in response to the transmission of the first message from the electronic device 300, or if a negative acknowledgment is received (i.e., a message indicating that the packet/frame was not successfully received/decoded), then at least some of the punctured bits stored in memory subsystem 330 are passed to the second radio 340-2 and transmitted by the second radio 340-2 in a second message using a second antenna system 350-2. The punctured bits may be embedded into one or more packets or frames, and the packet/frame may be addressed to the second electronic device. Note that antenna systems 350-1 and 350-2 may be the same antenna system or different antenna systems.

Figure 4:
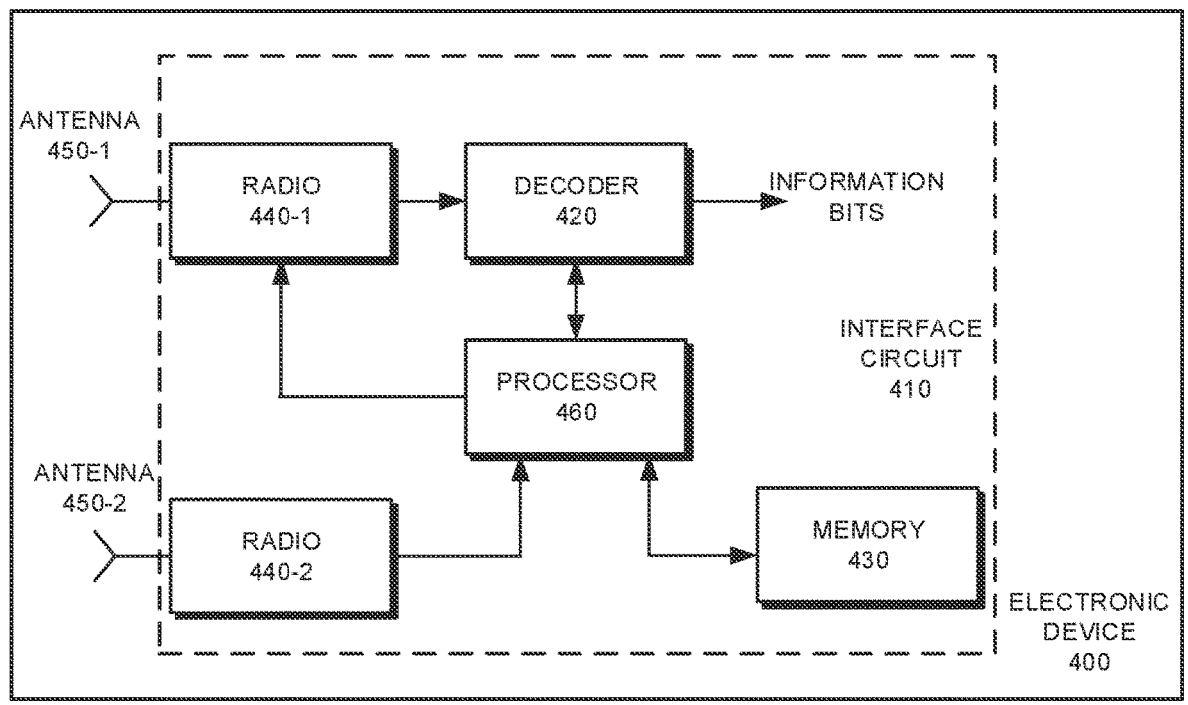
FIG. 4 is a block diagram illustrating components that may be used by an electronic device to receive information using multi-link hybrid ARQ according to embodiments of the present invention.

FIG. 4 is a block diagram illustrating components that may be used by an electronic device 400 to receive information using the multi-link hybrid ARQ communication techniques according to embodiments of the present invention.

As shown in FIG. 4, the electronic device 400 may include an interface circuit 410. It will be appreciated that all of the elements of the interface circuit 410 are not depicted in FIG. 4, and instead only certain elements are shown that are used to receive information using the multi-link hybrid ARQ communication techniques according to embodiments of the present invention.

The interface circuit 410 includes, among other things, an error detection/correction decoder 420. The error detection/correction decoder 420 may comprise a single module that performs both error detection and error correction decoding, or may comprise multiple modules (e.g., a first module that performs error detection decoding and a second module that performs error correction decoding). The error detection/correction decoder 420 may be implemented, for example, in hardware, software and/or firmware.

The interface circuit 410 may further include, or be in communication with, a memory subsystem 430 and a processor 460. The memory subsystem 430 may be used to store the encoded bits that are in packets/frames received at antenna 450-1 and processed by a first radio 440-1 in situations where the error detection/correction decoder 420 is unable to successfully decode the packet/frame. The interface circuit 410 further includes a second radio 440-2. The first radio 440-1 may, for example, be configured to transmit and receive RF signals in one of the 2.4 GHz or 5 GHz frequency band. The second radio 440-2 may, for example, be configured to transmit and receive RF signals in the other of the 2.4 GHz or 5 GHz frequency band.

During operation, a packet/frame is received at antenna 450-1 and passed to the first radio 440-1, where the received signal is demodulated to obtain a received bit stream. It will be appreciated that the received bit stream may include more than just information regarding a determined value for each received bit. For example, the received bit stream may include a determined value for each received bit as well as information as to the certainty (or uncertainty) regarding the determined value for each received bit or groups or constellations of received bits. The received bit stream may also be in the form of a stream of symbols and may include a determined value for each received symbol as well as information as to the certainty (or uncertainty) regarding the determined value for each received symbol or groups or constellations of received symbols. The information regarding the determined values and/or the uncertainty may be in any form, such as raw constellation values. Thus, it will be appreciated that as used herein the term "received bit stream" encompasses both received bit and/or symbol streams which may include determined values for each received bit/symbol as well as information as to the certainty (or uncertainty) regarding the determined value for each received bit/symbol or groups or constellations of received bits/symbols. The received bit stream is passed to the error detection/correction decoder 420 which attempts to decode the received bit stream. If the error detection/correction decoder 420 is able to successfully decode the packet/frame to recover the information bits contained therein (e.g., the error detection bits included in packet/frame indicate that the decoding operation was successful), then the successfully recovered information bits may be passed to another module of the electronic device 400 (not shown) and the error detection/correction decoder 420 may notify the processor 460 that the packet/frame was successfully decoded. The processor 460 may cause the first radio 440-1 to transmit an acknowledgment addressed to the electronic device that sent the packet/frame, where the acknowledgment indicates that the packet/frame was successfully received and decoded.

If instead the error detection/correction decoder 420 is unable to successfully decode the packet/frame, then no acknowledgement is sent to the transmitting electronic device (or a negative acknowledgement may be sent indicating that the packet/frame was not successfully received). The processor 460 may store in memory 430 the received bit stream (e.g., may store a determined value for each received bit and information regarding the uncertainty associated with the determined values). Based on the lack of any acknowledgement (or a negative acknowledgment), the sending electronic device will send the punctured bits using a second radio that operates in a different frequency band, as described above with reference to FIG. 3. The second transmission that includes the punctured bits may be received at radio 440-2, which demodulates the second transmission, and the second received bit stream may be passed to the processor 460. The processor 460 may combine the received bit stream (corresponding to the first transmission) with the second received bit stream (corresponding to the second transmission) in order to generate a combined received bit stream that corresponds to the encoded bit stream had no puncturing been performed. This combined received bit stream is then input to the error detection/correction decoder 420. Since the full encoded bit stream (which may now have errors due to interference, noise and/or fading during transmission) is used, the likelihood that the error detection/correction decoder 420 can correctly decode the bit stream is increased. In addition, since the punctured bits were transmitted over a different channel that operates in a different frequency band, the interference, noise and/or fading that prevented successful decoding of the first transmission is less likely to be present in the channel over which the punctured bits are transmitted, further increasing the likelihood that the decoding of the full bit stream will be successful.

Figure 5A:
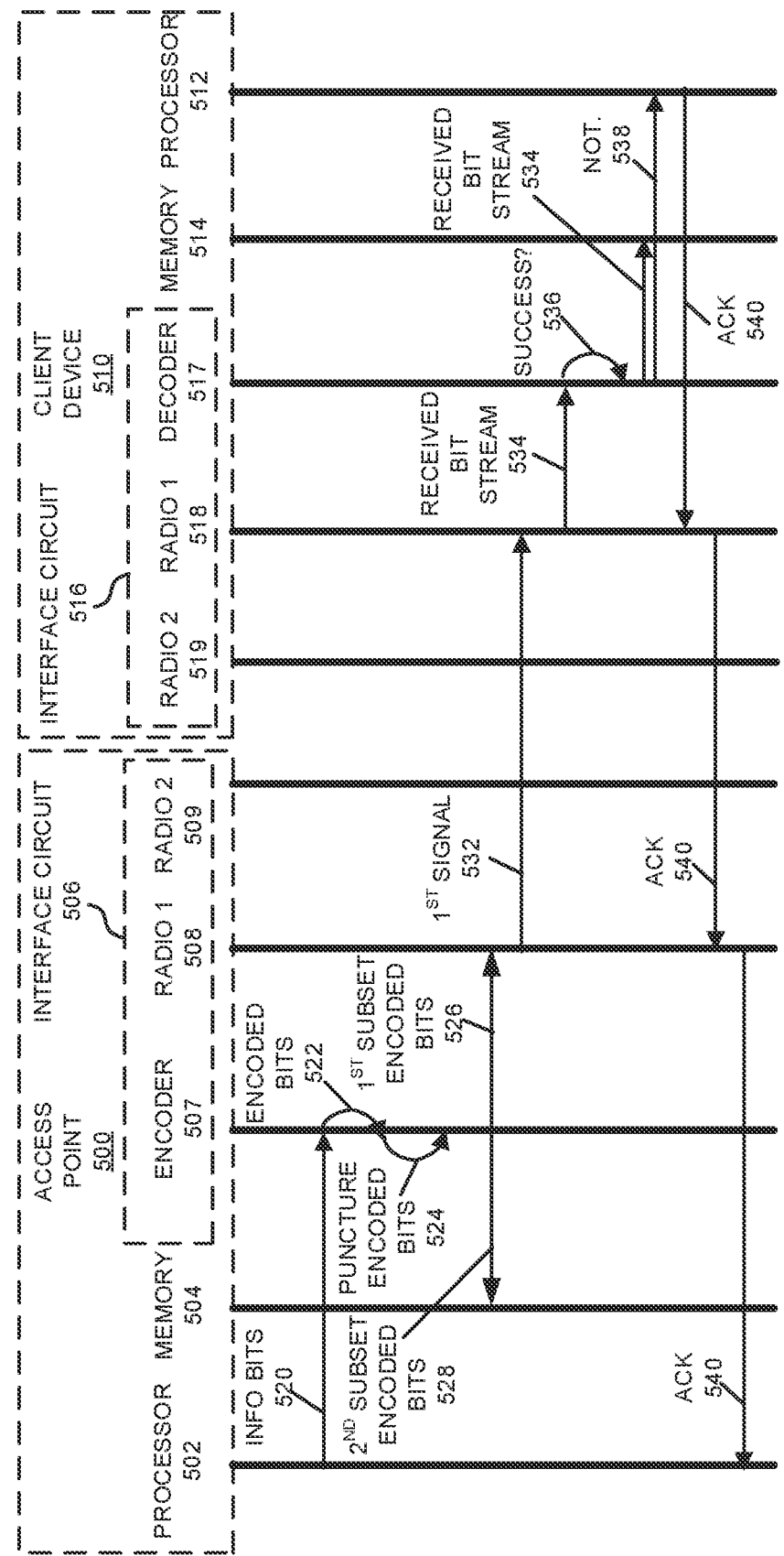
FIGS. 5A and 5B are schematic drawings illustrating an example of communications between an access point and a client device according to embodiments of the present invention.

FIG. 5A is a schematic drawing illustrating an example of communication between an access point 500 and a client device 510 according to embodiments of the present invention. The access point 500 includes, among other things, a processor 502, a memory 504 and an interface circuit 506. The interface circuit 506 includes an encoder 507, a first radio 508 and a second radio 509. The access point 500 is in communication with the client device 510. The client device 510 includes, among other things, a processor 512, a memory 514 and an interface circuit 516. The interface circuit 516 includes a decoder 517, a first radio 518 and a second radio 519.

As shown in FIG. 5A, operation may begin with a stream of information bits 520 being passed from the processor 502 (or at the direction of the processor 502) to the encoder 507. The encoder 507 may generate a stream of encoded bits 522 based on the information bits 520. The encoder 507 (or alternatively the processor 502) may puncture 524 the encoded bits 522 to divide the encoded bits into a first subset 526 (the non-punctured encoded bits) and a second subset 528 (the punctured encoded bits). The encoder 507 passes the first subset of encoded bits 526 to the first radio 508, and passes the second subset of encoded bits 528 to memory 504.

The first radio 508 generates a first signal 532 that is transmitted from the access point 500 (via an antenna system of the access point 500). The first signal 532 includes the first subset of encoded bits 526. The first signal 532 is addressed to the first radio 518 of the client device 510, which demodulates the received first signal 532 to provide a first received bit stream 534. The received bit stream 534 is passed to the decoder 517, which decodes the received bit stream 534 and then checks the recovered error detection code bits to determine if the decoding operation was successful 536. If so, the decoder 517 notifies 538 the processor 512, and the processor 512 causes an acknowledgment 540 to be sent from the first radio 518 of the client device 510 to the first radio 508 of the access point 500, and the demodulated acknowledgment is forwarded to the processor 502 of the access point 500. In this case, where the first signal 532 was successfully decoded, the second subset of the encoded bits 528 may be discarded from the memory 504 of the access point 500 in response to receipt of the acknowledgment 540.

As is further shown in FIG. 5A, the first received bit stream 534 is also stored in memory 514 at the client device 510. In the embodiment of FIG. 5A, the decoder 517 passes the first received bit stream 534 to memory 514, but embodiments of the present invention are not limited thereto. For example, in other embodiments, the first radio 518 or the processor 512 may pass the first received bit stream 534 to memory 514. In still other embodiments, the first received bit stream 534 may only be passed to memory 514 if the decoding operation 536 was not successful.

Figure 5B:
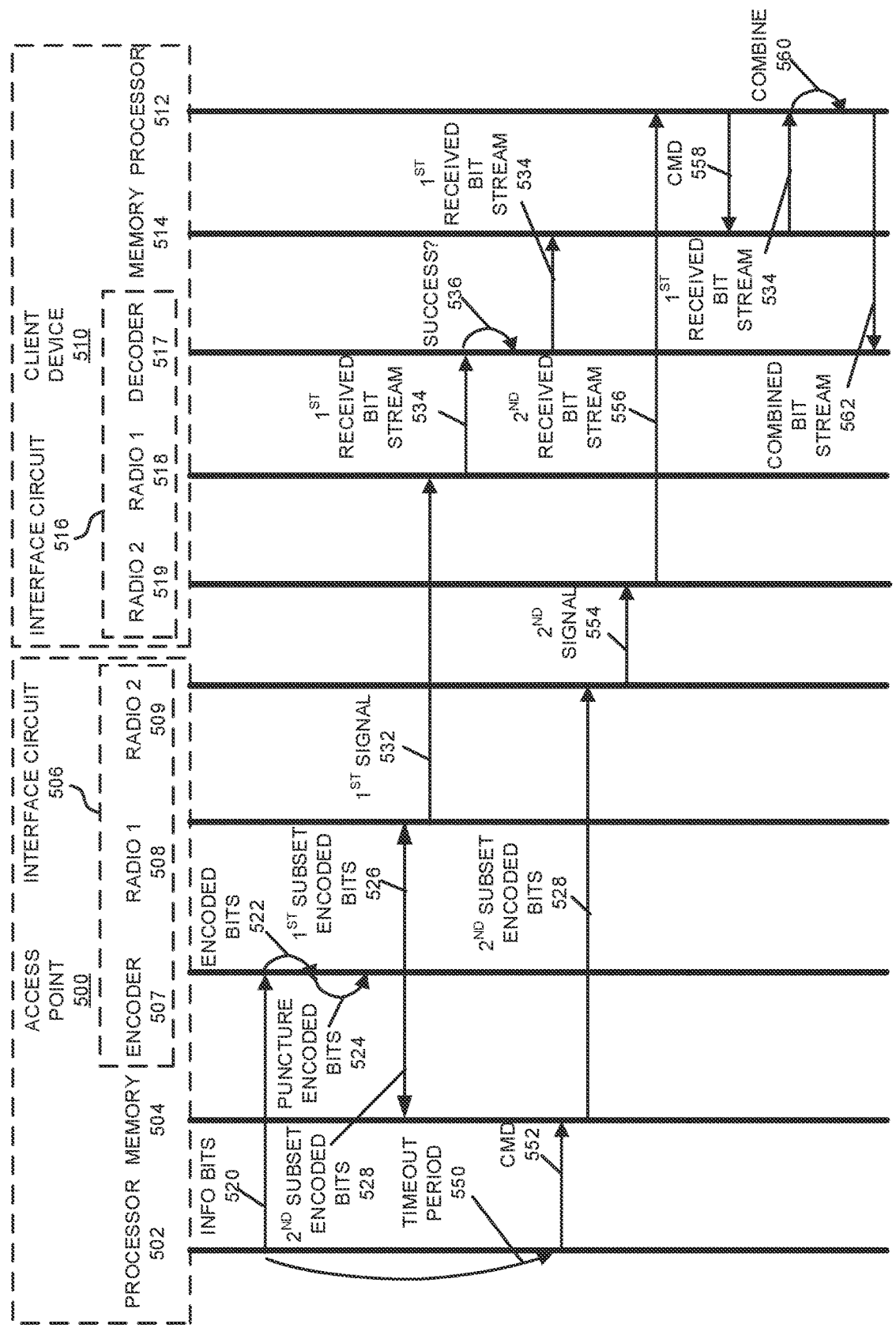

Turning next to FIG. 5B, the communications that may occur when the determination 536 indicates that the first signal was not successfully decoded are illustrated. Operations 520 through 534 are identical in FIGS. 5A and 5B, and hence these operations will not be described again with respect to FIG. 5B.

As shown in FIG. 5B, after sending the information bits 520 to the encoder, the processor 502 in access point 500 may set a clock for a timeout period 550. If by the expiration of the timeout period an acknowledgment has not been received in response to the first signal 532, the processor 502 in access point 500 assumes that the first signal 532 was not successfully received by the client device 510. Alternatively, the processor 502 may be actively notified that the first signal 532 was not successfully received by the client device 510 by a negative acknowledgment such as, for example, receipt of a block acknowledgment in which the packet sequence number corresponding to the first signal is missing. The processor 502 then sends a command 552 to memory 504 that causes the second subset of the encoded bits 528 that are stored therein to be passed to the second radio 509. The second radio 509 transmits a second signal 554 that includes at least some of the second subset of the encoded bits 528 that is addressed to the second radio 519 of the client device 510. The second radio 519 of the client device 510 receives and demodulates the second signal 554 to recover a second received bit stream 556. The second received bit stream 556 is passed to the processor 512 of the client device 510. The processor 512 prompts 558 memory 514 to return the first received bit stream 534, and then combines 560 the first and second received bits streams to generate a combined received bit stream 562. The combined received bit stream 562 is passed to the decoder 517 where it is decoded. As discussed above, since the full encoded bit stream is available to the decoder 517, the likelihood that the decoder 517 can correctly decode the combined received bit stream is increased. In addition, since the punctured bits were transmitted over a different channel that operates in a different frequency band, the interference, noise and/or fading that prevented successful decoding of the first transmission is less likely to be present in the channel over which the punctured bits are transmitted, further increasing the likelihood that the decoding of the full bit stream will be successful.

Figure 6:
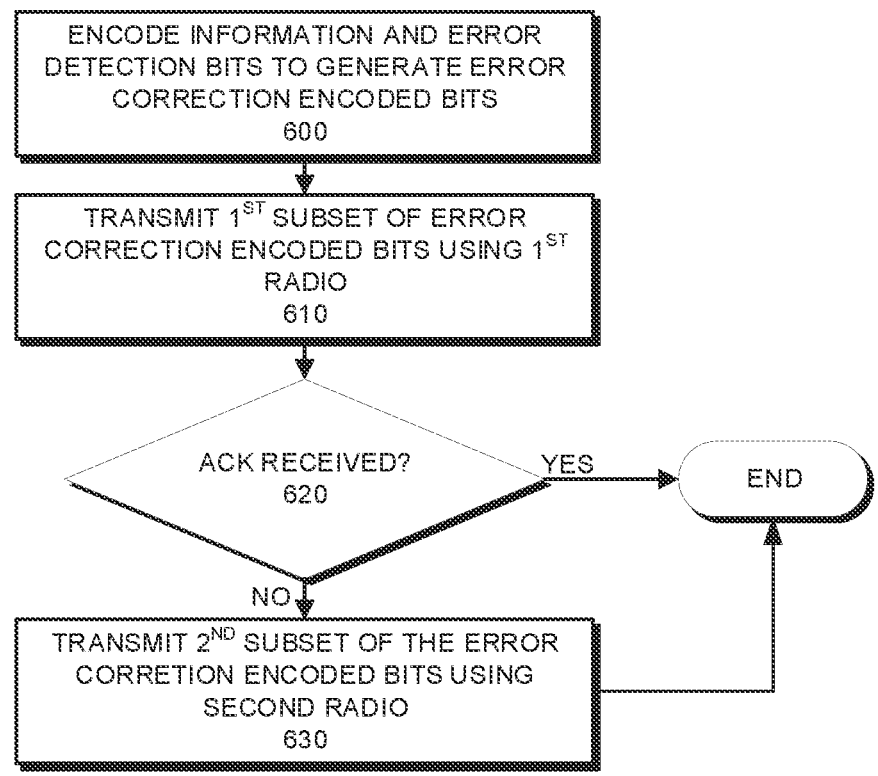
FIG. 6 is a flow chart illustrating another method for an electronic device to communicate in a wireless local area network according to embodiments of the present invention.

FIG. 6 is a flow chart illustrating a method for an electronic device to communicate in a wireless local area network according to further embodiments of the present invention. As shown in FIG. 6, operations may begin with a combination of information bits and error detection bits being processed by an error correction encoder to generate a plurality of error correction encoded bits (block 600). A first radio of the electronic device is then used to transmit a first subset of the error correction encoded bits in a first message over a first channel (block 610). If, in response to the transmission of the first message, an acknowledgment is received (block 620), then operations may end. If instead, no acknowledgment is received (block 620) within a timeout period, then a second radio is used to transmit a second subset of the error correction encoded bits in a second message over a second channel (block 630).

Figure 7:
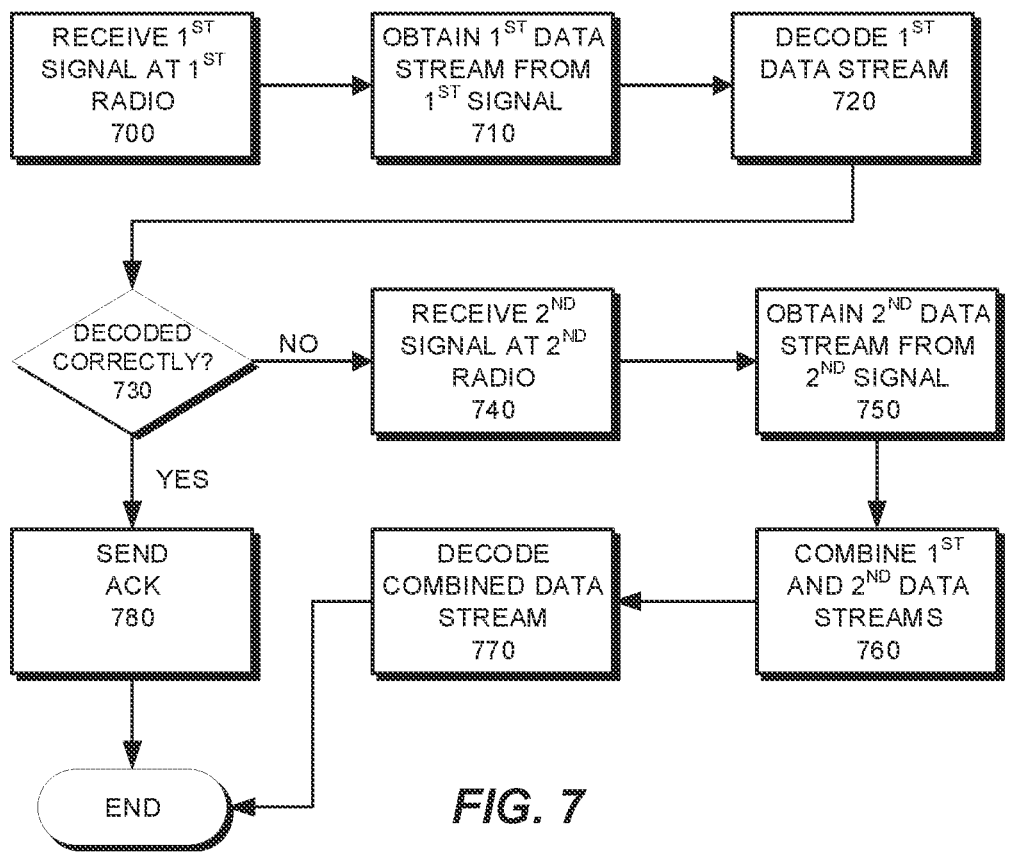
FIG. 7 is a flow chart illustrating yet another method for communicating in a wireless local area network according to embodiments of the present invention.

FIG. 7 is a flow chart illustrating a method for communicating in a wireless local area network according to additional embodiments of the present invention. As shown in FIG. 7, operations may begin with a first signal being received at a first radio of an electronic device (block 700). The first signal is demodulated to recover a first received bit stream (block 710). The first received bit stream is decoded using a decoder (block 720). A determination is then made regarding whether or not the first received bit stream was successfully decoded (block 730). This determination may be made by comparing recovered error detection bits to the other recovered bits. If it is determined that the first received bit stream was correctly decoded, then an acknowledgment may be sent by the first radio indicating that the first signal was correctly received (block 780), and operations may end. If, however, it is determined that the first received bit stream was not correctly decoded, then no acknowledgment is sent, and thereafter a second signal may be received at the second radio (block 740). The second signal is demodulated to recover a second received bit stream (block 750). The second received bit stream may include bits that were punctured from the bit stream included in the first signal. The first and second received bit streams may then be combined to form a combined bit stream (block 760). The combined bit stream may then be decoded using the decoder (block 770).

It will be appreciated that the methods discussed above with reference to FIGS. 2, 6 and 7 may include additional, fewer or different operations. Furthermore, the order of the operations may be changed, and/or two or more operations may be combined into a single operation, or a single operation may be divided into two or more operations. It will also be appreciated that a negative acknowledgement may be sent by the receiving electronic device instead of no acknowledgment, and this negative acknowledgment may be used to trigger transmission of the second subset of encoded bits.

Figure 8:
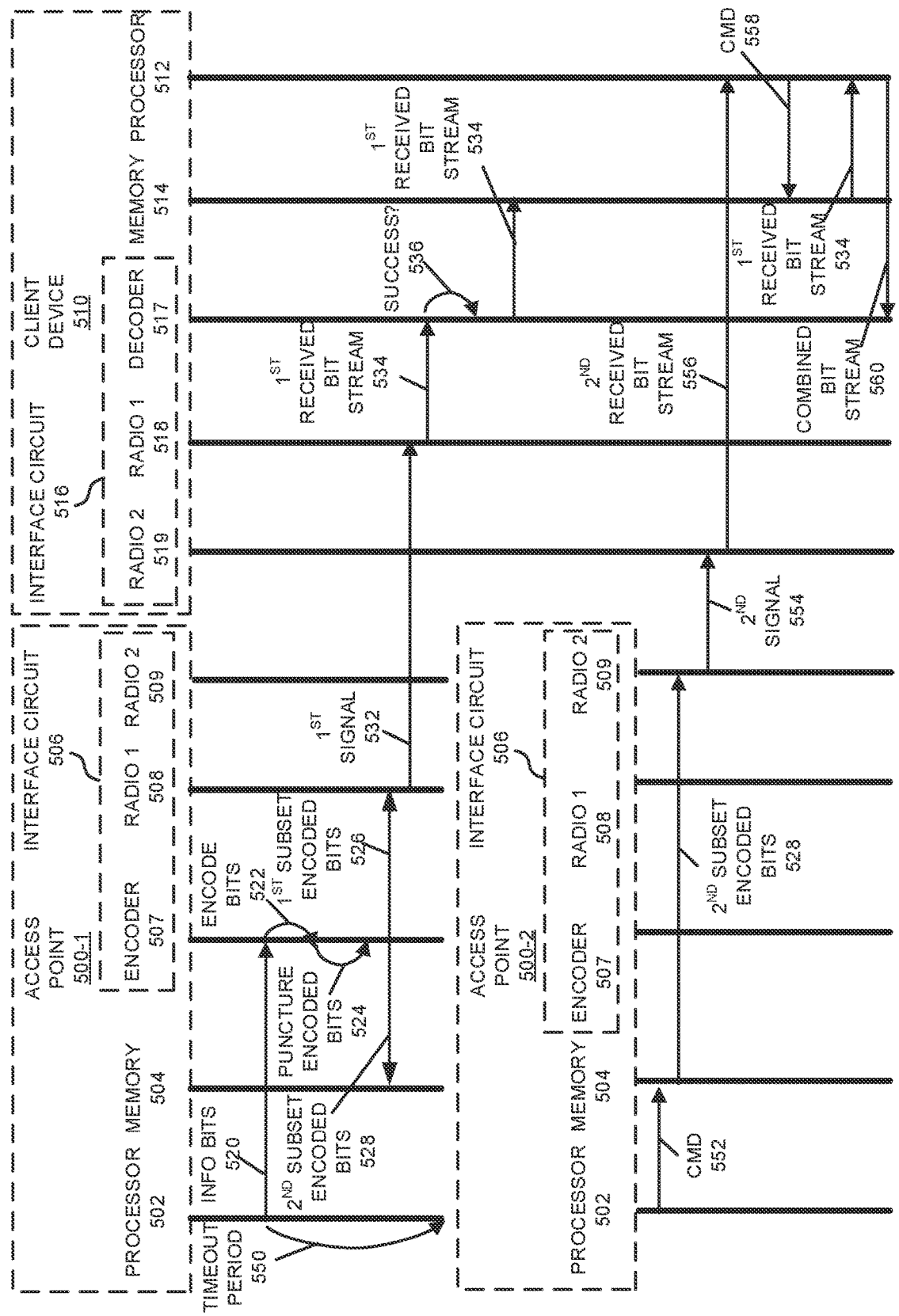
FIG. 8 is a schematic drawing illustrating an example of communications between two access points and a client device according to embodiments of the present invention.

As discussed above, FIGS. 5A and 5B illustrate operations that may be performed to use multi-link hybrid ARQ for communications from an access point to a client device. It will be appreciated that the exact same operations may be used for communication between a client device and an access point (i.e., the labels "access point 500" and "client device 510" may be swapped in FIGS. 5A-5B. When the client device is communicating using multi-link hybrid ARQ, it may, in some embodiments, communicate with two different access points instead of with a single access point. FIG. 8 is a schematic drawing illustrating an example of communication between a client device and two different access points according to embodiments of the present invention.

As can be seen, the operations shown in FIG. 8 are very similar to the operations shown in FIG. 5B. However, in the embodiment of FIG. 8, the second signal 554 is transmitted to the client device 510 from a second access point 500-2 instead of from the first access point 500/500-1. The second access point 500-2 may be in communication with the first access point 500-1 via, for example, a wired Ethernet connection that is not illustrated in FIG. 8. The first access point 500-1 may provide the second subset of the encoded bits 528 and an address for the client device 510 to the second access point 500-2 if, for example, the timeout period 550 expires. The second access point 500-2 may then use this information to transmit the second signal 554 that includes the second subset of the encoded bits 528 to the client device 510. Since the second access point 500-2 and the first access point 500-1 are typically located in different places, the independence between the first and second signals 532, 554 in terms of interference, noise and multipath fading may be further increased.

Figure 9:
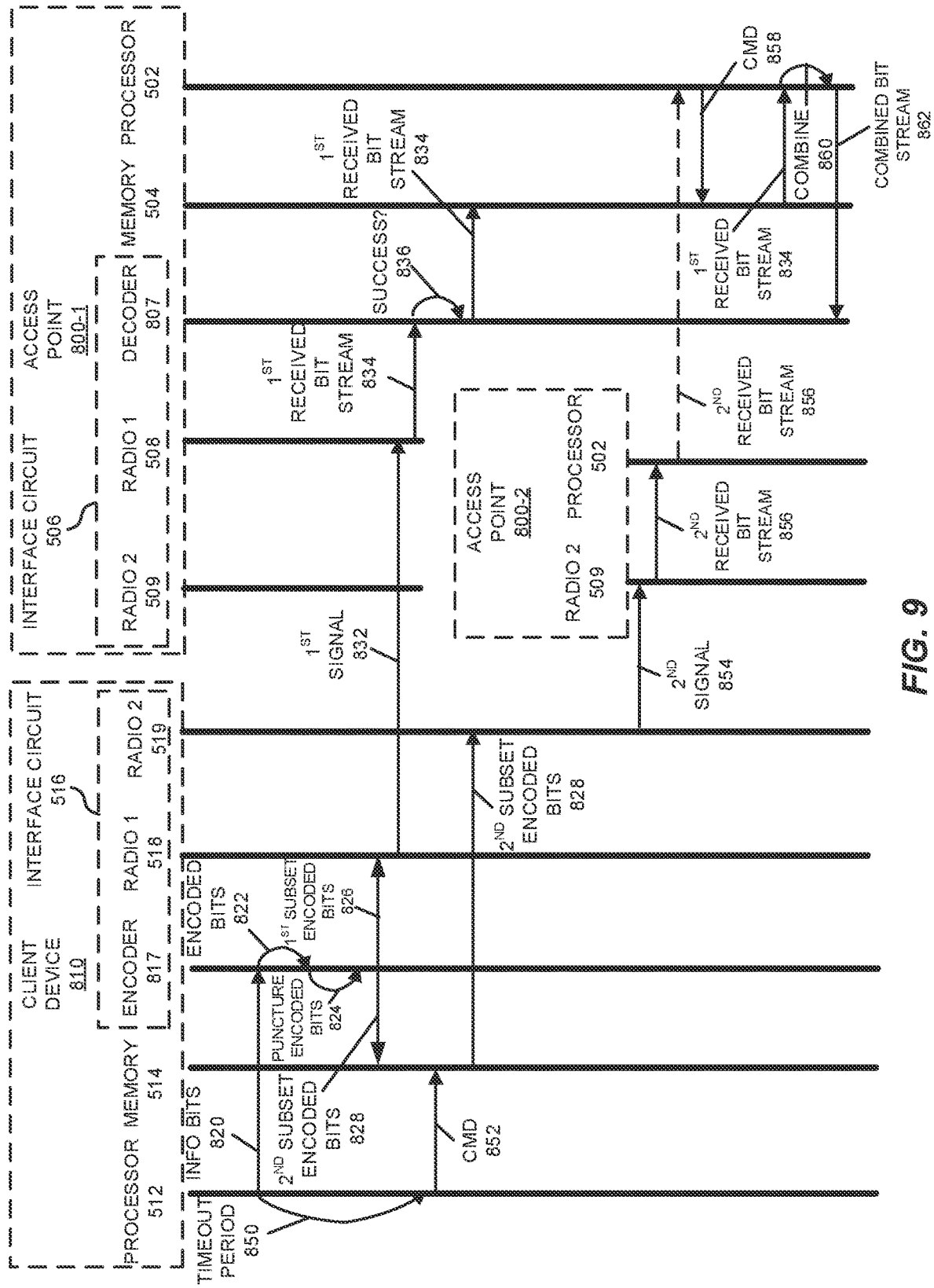
FIG. 9 is a schematic drawing illustrating an example of communications between a client device and two access points according to further embodiments of the present invention.

FIG. 9 is a schematic drawing illustrating an example of communications from a client device 810 to the pair of access points 800-1, 800-2. The client device 810 and the pair of access points 800-1, 800-2 are almost identical to the client device 510 and the access points 500-1, 500-2 of FIG. 8, except that except that the client device 810 includes an encoder 817 instead of a decoder 517, and each access point 800-1, 800-2 includes a decoder 807 instead of an encoder 507. Thus, further description of the client device 810 and the access points 800-1, 800-2 will be omitted.

As shown in FIG. 9, operations may begin with a stream of information bits 820 being passed from the processor 512 of client device 810 (or at the direction of the processor 512) to the encoder 817. The encoder 817 may generate a stream of encoded bits 822 based on the information bits 820. The encoder 817 may puncture 824 the encoded bits 822 to divide the encoded bits into a first subset 826 (the non-punctured encoded bits) and a second subset 828 (the punctured encoded bits). The encoder 817 passes the first subset of encoded bits 826 to the first radio 518, and passes the second subset of encoded bits 828 to memory 514.

The first radio 518 generates a first signal 832 that is transmitted from the client device 810. The first signal 832 includes the first subset of encoded bits 826. The first signal 832 is addressed to the first radio 508 of the first access point 800-1. The first radio 508 of the first access point 800 receives and demodulates the first signal 832 to provide a first received bit stream 834. The first received bit stream 834 is passed to the decoder 807 of the first access point 800-1, which decodes the received bit stream 834 and then checks the recovered error detection code bits to determine if the decoding operation was successful 836. While not shown in FIG. 9, if the decoding operation was successful 836, the decoder 807 notifies the processor 802, and the processor 802 causes an acknowledgment to be sent from the first radio 508 of access point 800-1 to the first radio 518 of the client device 810, and the demodulated acknowledgment is forwarded to the processor 512, at which points operations may end.

If instead, the determination 836 indicates that the first signal 832 was not successfully decoded then a negative acknowledgement (not shown) is sent from the first access point 800-1 back to the client device or no acknowledgment is sent from the first access point 800-1 back to the client device. A timeout clock was previously set at the client device 810, and the timeout period eventually runs out 850 without receipt of an acknowledgment in response to the first signal 832. At that point the processor 512 in client device 810 assumes that the first signal 832 was not successfully received by the first access point 800-1. The processor 512 then sends a command 852 to memory 514 that causes the second subset of the encoded bits 828 that are stored therein to be passed to the second radio 519. The second radio 519 transmits a second signal 854 that includes the second subset of the encoded bits 828 that is addressed to the second radio 509 of the second access point 800-2. The second radio 509 of the second access point 800-2 receives and demodulates the second signal 854 to recover a second received bit stream 856. The second received bit stream 856 is passed to the processor 502 of the second access point 800-2 which in turn passes the second received bit stream 856 to the interface circuit 506 of the first access point 800-1 via a connection that is not illustrated in FIG. 9, but which is shown schematically via a dashed line. The second received bit stream 856 may be passed from the second access point 800-2 to the first access point 800-1 over, for example, a wired Ethernet connection.

The processor 502 of the first access point 800-1 then commands 858 memory 504 to return the first received bit stream 834, and the processor 502 then combines 860 the first and second received bits streams 834, 856 to generate a combined bit stream 862. The combined bit stream 862 is passed to the decoder 807 of the first access point 800-1 where it is decoded.

It should be noted that FIG. 9 shows the first and second received bit streams 834, 856 being combined at the first access point 800-1. It will be appreciated that in other embodiments the first access point 800-1 may provide the first received bit stream 834 to the second access point 800-2, and the second access point 800-2 may combine the first and second received bit streams 834, 856 to generate the combined bit stream 860. The combined bit stream 862 may then, for example, be sent from the second access point 800-2 back to the first access point 800-1.

While the present invention has primarily been discussed above with respect to performing hybrid ARQ using a 2.4 GHz communication channel and a 5 GHz communication channel, it will be appreciated that embodiments of the present invention are not limited thereto. For example, WiFi is being expanded to operate in the 6 GHz frequency band, and hence either the 2.4 GHz communication channel or the 5 GHz communication channel could be replaced with a 6 GHz communication channel. The same is true with respect to a 60 GHz communication channel. Additionally, a single physical "radio" unit may be developed to support communications in multiple of the WiFi frequency bands such as, for example, the 5 GHz and 6 GHz frequency bands. It will be appreciated that such a single radio unit operates as two separate radios, namely a 5 GHz radio and a 6 GHz radio even though implemented as a single unit, and that such a radio would read on the first and second radios discussed herein.

Figure 10:
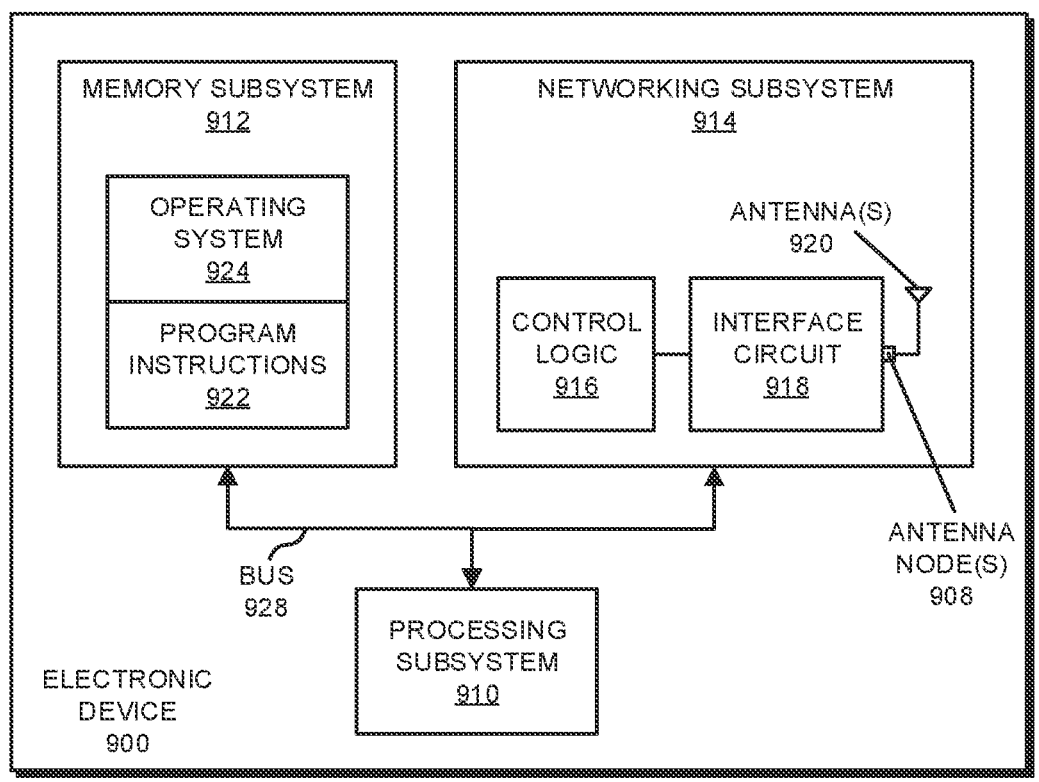
FIG. 10 is a block diagram of an electronic device (e.g., an access point or a client device) according to embodiments of the present invention.

FIG. 10 is a block diagram illustrating an electronic device 900 in accordance with some embodiments. The electronic device 900 may be, for example, one of the access points 110 or one of the client devices 120 illustrated in FIG. 1. The electronic device 900 includes a processing subsystem 910, a memory subsystem 912, and a networking subsystem 914. Processing subsystem 910 includes one or more devices configured to perform computational operations. Memory subsystem 912 includes one or more devices for storing data and/or instructions. In some embodiments, the instructions may include an operating system and one or more program modules which may be executed by processing subsystem 910.

Networking subsystem 914 includes one or more devices configured to couple to and communicate on a wired and/or wireless network (i.e., to perform network operations), including: control logic 916, an interface circuit 918 and one or more antennas 920 (or antenna elements). While FIG. 10 includes an antenna 920, in some embodiments electronic device 900 includes one or more nodes, such as nodes 908, e.g., a connector, which can be coupled to one or more antennas 920 that are external to the electronic device 900. Thus, electronic device 900 may or may not include the one or more antennas 920. Networking subsystem 914 includes at least a networking system based on the standards described in IEEE 802.11 (e.g., a Wi-Fi networking system).

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting frames and/or scanning for frames transmitted by other electronic devices.

Processing subsystem 910, memory subsystem 912, and networking subsystem 914 are coupled together using bus 928. Bus 928 may include an electrical, optical, and/or electro-optical connection that the subsystems can use to communicate commands and data among one another.

Electronic device 900 can be (or can be included in) any electronic device with at least one network interface. For example, electronic device 900 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

The operations performed in the communication techniques according to embodiments of the present invention may be implemented in hardware or software, and in a wide variety of configurations and architectures. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A method for a first electronic device that includes a first radio and a second radio to communicate in a wireless local area network, the method comprising:
   encoding information bits at the first electronic device to provide a plurality of encoded bits;
   puncturing the encoded bits into at least a first subset of encoded bits and a second subset of encoded bits, wherein the first subset includes at least a first bit and the second subset includes at least a second bit;
   using the first radio to transmit the first subset of encoded bits in a first message over a first channel that is within a first frequency band; and using the second radio to transmit the second subset of encoded bits in a second message over a second channel that is within a second frequency band.

2. The method of claim 1, wherein the first electronic device is an access point and the first message and the second message are both addressed to a client device.

3. The method of claim 1, wherein the first electronic device is a client device and the first message is addressed to a first access point.

4. The method of claim 3, wherein the second message is addressed to a second access point.

5. The method of claim 3, wherein the second message is addressed to the first access point.

6. The method of claim 1, wherein the first channel and the second channel are concurrently established between the first electronic device and a second electronic device.

7. The method of claim 1, wherein the first channel is within one of a 2.4 GHz frequency band and a 5 GHz frequency band and the second channel is within the other of the 2.4 GHz frequency band and the 5 GHz frequency band.

8. The method of claim 1, wherein the first and second subsets of encoded bits together include all of the encoded bits.

9. The method of claim 1, wherein the first and second subsets of encoded bits together include less than all of the encoded bits.

10. The method of claim 1, wherein the first and second messages are transmitted concurrently.

11. The method of claim 1, wherein a puncture rate used to puncture the encoded bits is selected based on an estimate of communication channel conditions.

12. The method of claim 1, wherein the second message is transmitted in response to not receiving an acknowledgment within a predetermined timeout period in response to the first message.

13. The method of claim 1, wherein the second message is transmitted in response to receiving a negative acknowledgment in response to the first message.

* * * * *